(12) United States Patent
Agrawal

(10) Patent No.: US 8,868,494 B2
(45) Date of Patent: Oct. 21, 2014

(54) SYSTEMS AND METHODS FOR SELECTIVE DATA REPLICATION

(71) Applicant: CommVault Systems, Inc., Oceanport, NJ (US)

(72) Inventor: Vijay H. Agrawal, Pune (IN)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

(21) Appl. No.: 13/957,824

(22) Filed: Aug. 2, 2013

(65) Prior Publication Data

US 2014/0074777 A1    Mar. 13, 2014

Related U.S. Application Data

(63) Continuation of application No. 12/749,280, filed on Mar. 29, 2010, now Pat. No. 8,504,517.

(51) Int. Cl.
*G06F 17/30* (2006.01)
(52) U.S. Cl.
CPC .... *G06F 17/30174* (2013.01); *G06F 17/30578* (2013.01)
USPC ........................................ 707/610
(58) Field of Classification Search
USPC ................................. 707/610, 691
See application file for complete search history.

(56) References Cited

U.S. PATENT DOCUMENTS

| 4,296,465 A | 10/1981 | Lemak |
| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |

(Continued)

FOREIGN PATENT DOCUMENTS

| AU | 2006331932 | 12/2006 |
| CA | 2632935 | 12/2006 |

(Continued)

OTHER PUBLICATIONS

Armstead et al., "Implementation of a Campus-Wide Distributed Mass Storage Service: The Dream vs. Reality," IEEE, 1995, pp. 190-199.

(Continued)

*Primary Examiner* — Joshua Bullock
(74) *Attorney, Agent, or Firm* — Knobbe, Martens, Olson & Bear, LLP

(57) ABSTRACT

Systems and methods for performing data replication are disclosed. Determining whether to update replicated data typically involves comparison of readily obtainable attributes of a given source file and its corresponding replicated file. Such attributes can be obtained from, for example, metadata. In certain situations, an additional assessment of the source and replicated files can be beneficial. For example, if integrity of an existing replicated file's content is maintained, one may not want to re-replicate the corresponding source file. For large source files, such a decision can provide substantial reductions in expenditures of available computing and network resources. In certain embodiments, a threshold for identifying such large files can be based on one or more operating parameters such as network type and available bandwidth. In certain embodiments, replication file's integrity can be checked by calculating and comparing checksums for the replication file and its corresponding source file.

20 Claims, 4 Drawing Sheets

(56) References Cited

U.S. PATENT DOCUMENTS

| | | |
|---|---|---|
| 5,231,668 A | 7/1993 | Kravitz |
| 5,239,647 A | 8/1993 | Anglin et al. |
| 5,241,668 A | 8/1993 | Eastridge et al. |
| 5,241,670 A | 8/1993 | Eastridge et al. |
| 5,263,154 A | 11/1993 | Eastridge et al. |
| 5,265,159 A | 11/1993 | Kung |
| 5,276,860 A | 1/1994 | Fortier et al. |
| 5,276,867 A | 1/1994 | Kenley et al. |
| 5,287,500 A | 2/1994 | Stoppani, Jr. |
| 5,301,351 A | 4/1994 | Jippo |
| 5,311,509 A | 5/1994 | Heddes et al. |
| 5,317,731 A | 5/1994 | Dias et al. |
| 5,321,816 A | 6/1994 | Rogan et al. |
| 5,333,315 A | 7/1994 | Saether et al. |
| 5,347,653 A | 9/1994 | Flynn et al. |
| 5,369,757 A | 11/1994 | Spiro et al. |
| 5,403,639 A | 4/1995 | Belsan et al. |
| 5,410,700 A | 4/1995 | Fecteau et al. |
| 5,448,724 A | 9/1995 | Hayashi et al. |
| 5,455,926 A | 10/1995 | Keele et al. |
| 5,487,072 A | 1/1996 | Kant |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,546,536 A | 8/1996 | Davis et al. |
| 5,555,404 A | 9/1996 | Torbjornsen et al. |
| 5,559,957 A | 9/1996 | Balk |
| 5,559,991 A | 9/1996 | Kanfi |
| 5,598,546 A | 1/1997 | Blomgren |
| 5,604,862 A | 2/1997 | Midgely et al. |
| 5,615,392 A | 3/1997 | Harrison et al. |
| 5,619,644 A | 4/1997 | Crockett et al. |
| 5,638,509 A | 6/1997 | Dunphy et al. |
| 5,642,496 A | 6/1997 | Kanfi |
| 5,673,381 A | 9/1997 | Huai et al. |
| 5,675,511 A | 10/1997 | Prasad et al. |
| 5,677,900 A | 10/1997 | Nishida et al. |
| 5,682,513 A | 10/1997 | Candelaria et al. |
| 5,687,343 A | 11/1997 | Fecteau et al. |
| 5,689,706 A | 11/1997 | Rao et al. |
| 5,699,361 A | 12/1997 | Ding et al. |
| 5,719,786 A | 2/1998 | Nelson et al. |
| 5,720,026 A | 2/1998 | Uemura et al. |
| 5,729,743 A | 3/1998 | Squibb |
| 5,737,747 A | 4/1998 | Vishlitsky et al. |
| 5,742,792 A | 4/1998 | Yanai et al. |
| 5,751,997 A | 5/1998 | Kullick et al. |
| 5,758,359 A | 5/1998 | Saxon |
| 5,761,677 A | 6/1998 | Senator et al. |
| 5,761,734 A | 6/1998 | Pfeffer et al. |
| 5,764,972 A | 6/1998 | Crouse et al. |
| 5,765,173 A | 6/1998 | Cane et al. |
| 5,778,395 A | 7/1998 | Whiting et al. |
| 5,790,114 A | 8/1998 | Geaghan et al. |
| 5,790,828 A | 8/1998 | Jost |
| 5,805,920 A | 9/1998 | Sprenkle et al. |
| 5,812,398 A | 9/1998 | Nielsen |
| 5,813,009 A | 9/1998 | Johnson et al. |
| 5,813,017 A | 9/1998 | Morris |
| 5,829,046 A | 10/1998 | Tzelnic et al. |
| 5,860,104 A | 1/1999 | Witt et al. |
| 5,875,478 A | 2/1999 | Blumenau |
| 5,875,481 A | 2/1999 | Ashton et al. |
| 5,878,408 A | 3/1999 | Van Huben et al. |
| 5,887,134 A | 3/1999 | Ebrahim |
| 5,901,327 A | 5/1999 | Ofek |
| 5,907,621 A | 5/1999 | Bachman et al. |
| 5,907,672 A | 5/1999 | Matze et al. |
| 5,924,102 A | 7/1999 | Perks |
| 5,926,836 A | 7/1999 | Blumenau |
| 5,933,104 A | 8/1999 | Kimura |
| 5,933,601 A | 8/1999 | Fanshier et al. |
| 5,950,205 A | 9/1999 | Aviani, Jr. |
| 5,956,519 A | 9/1999 | Wise et al. |
| 5,958,005 A | 9/1999 | Thorne et al. |
| 5,970,233 A | 10/1999 | Liu et al. |
| 5,970,255 A | 10/1999 | Tran et al. |
| 5,974,563 A | 10/1999 | Beeler, Jr. |
| 5,987,478 A | 11/1999 | See et al. |
| 5,991,779 A | 11/1999 | Bejar |
| 5,995,091 A | 11/1999 | Near et al. |
| 6,003,089 A | 12/1999 | Shaffer et al. |
| 6,009,274 A | 12/1999 | Fletcher et al. |
| 6,012,090 A | 1/2000 | Chung et al. |
| 6,021,415 A | 2/2000 | Cannon et al. |
| 6,021,475 A | 2/2000 | Nguyen et al. |
| 6,023,710 A | 2/2000 | Steiner et al. |
| 6,026,414 A | 2/2000 | Anglin |
| 6,049,889 A | 4/2000 | Steely, Jr. et al. |
| 6,052,735 A | 4/2000 | Ulrich et al. |
| 6,058,066 A | 5/2000 | Norris et al. |
| 6,061,692 A | 5/2000 | Thomas et al. |
| 6,072,490 A | 6/2000 | Bates et al. |
| 6,076,148 A | 6/2000 | Kedem et al. |
| 6,088,697 A | 7/2000 | Crockett et al. |
| 6,094,416 A | 7/2000 | Ying |
| 6,105,129 A | 8/2000 | Meier et al. |
| 6,112,239 A | 8/2000 | Kenner et al. |
| 6,122,668 A | 9/2000 | Teng et al. |
| 6,131,095 A | 10/2000 | Low et al. |
| 6,131,148 A | 10/2000 | West et al. |
| 6,131,190 A | 10/2000 | Sidwell |
| 6,137,864 A | 10/2000 | Yaker |
| 6,148,377 A | 11/2000 | Carter et al. |
| 6,148,412 A | 11/2000 | Cannon et al. |
| 6,154,787 A | 11/2000 | Urevig et al. |
| 6,154,852 A | 11/2000 | Amundson et al. |
| 6,158,044 A | 12/2000 | Tibbetts |
| 6,161,111 A | 12/2000 | Mutalik et al. |
| 6,163,856 A | 12/2000 | Dion et al. |
| 6,167,402 A | 12/2000 | Yeager |
| 6,175,829 B1 | 1/2001 | Li et al. |
| 6,195,695 B1 | 2/2001 | Cheston et al. |
| 6,205,450 B1 | 3/2001 | Kanome |
| 6,212,512 B1 | 4/2001 | Barney et al. |
| 6,212,521 B1 | 4/2001 | Minami et al. |
| 6,230,164 B1 | 5/2001 | Rekieta et al. |
| 6,260,068 B1 | 7/2001 | Zalewski et al. |
| 6,260,069 B1 | 7/2001 | Anglin |
| 6,269,431 B1 | 7/2001 | Dunham |
| 6,275,953 B1 | 8/2001 | Vahalia et al. |
| 6,279,078 B1 | 8/2001 | Sicola et al. |
| 6,292,783 B1 | 9/2001 | Rohler |
| 6,301,592 B1 | 10/2001 | Aoyama et al. |
| 6,304,880 B1 | 10/2001 | Kishi |
| 6,311,193 B1 | 10/2001 | Sekido et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| 6,350,199 B1 | 2/2002 | Williams et al. |
| RE37,601 E | 3/2002 | Eastridge et al. |
| 6,353,878 B1 | 3/2002 | Dunham |
| 6,356,801 B1 | 3/2002 | Goodman et al. |
| 6,363,464 B1 | 3/2002 | Mangione |
| 6,366,986 B1 | 4/2002 | St. Pierre et al. |
| 6,366,988 B1 | 4/2002 | Skiba et al. |
| 6,374,336 B1 | 4/2002 | Peters et al. |
| 6,374,363 B1 | 4/2002 | Wu et al. |
| 6,389,432 B1 | 5/2002 | Pothapragada et al. |
| 6,397,308 B1 | 5/2002 | Ofek |
| 6,418,478 B1 | 7/2002 | Ignatius et al. |
| 6,421,711 B1 | 7/2002 | Blumenau et al. |
| 6,434,681 B1 | 8/2002 | Armangau |
| 6,438,595 B1 | 8/2002 | Blumenau et al. |
| 6,466,950 B1 | 10/2002 | Ono |
| 6,473,775 B1 | 10/2002 | Kusters et al. |
| 6,487,561 B1 | 11/2002 | Ofek et al. |
| 6,487,644 B1 | 11/2002 | Huebsch et al. |
| 6,487,645 B1 | 11/2002 | Clark et al. |
| 6,502,205 B1 | 12/2002 | Yanai et al. |

(56) References Cited

U.S. PATENT DOCUMENTS

| | | |
|---|---|---|
| 6,516,314 B1 | 2/2003 | Birkler et al. |
| 6,516,327 B1 | 2/2003 | Zondervan et al. |
| 6,516,348 B1 | 2/2003 | MacFarlane et al. |
| 6,519,679 B2 | 2/2003 | Devireddy et al. |
| 6,538,669 B1 | 3/2003 | Lagueux, Jr. et al. |
| 6,539,462 B1 | 3/2003 | Mikkelsen et al. |
| 6,542,468 B1 | 4/2003 | Hatakeyama |
| 6,542,909 B1 | 4/2003 | Tamer et al. |
| 6,542,972 B2 | 4/2003 | Ignatius et al. |
| 6,564,228 B1 | 5/2003 | O'Connor |
| 6,564,229 B1 | 5/2003 | Baweja et al. |
| 6,564,271 B2 | 5/2003 | Micalizzi, Jr. et al. |
| 6,581,143 B2 | 6/2003 | Gagne et al. |
| 6,604,118 B2 | 8/2003 | Kleinman et al. |
| 6,604,149 B1 | 8/2003 | Deo et al. |
| 6,611,849 B1 | 8/2003 | Raff et al. |
| 6,615,223 B1 | 9/2003 | Shih et al. |
| 6,629,189 B1 | 9/2003 | Sandstrom |
| 6,631,477 B1 | 10/2003 | LeCrone et al. |
| 6,631,493 B2 | 10/2003 | Ottesen et al. |
| 6,647,396 B2 | 11/2003 | Parnell et al. |
| 6,647,473 B1 | 11/2003 | Golds et al. |
| 6,651,075 B1 | 11/2003 | Kusters et al. |
| 6,654,825 B2 | 11/2003 | Clapp et al. |
| 6,658,436 B2 | 12/2003 | Oshinsky et al. |
| 6,658,526 B2 | 12/2003 | Nguyen et al. |
| 6,662,198 B2 | 12/2003 | Satyanarayanan et al. |
| 6,665,815 B1 | 12/2003 | Goldstein et al. |
| 6,681,230 B1 | 1/2004 | Blott et al. |
| 6,691,209 B1 | 2/2004 | O'Connell |
| 6,721,767 B2 | 4/2004 | De Meno et al. |
| 6,728,733 B2 | 4/2004 | Tokui |
| 6,732,124 B1 | 5/2004 | Koseki et al. |
| 6,732,125 B1 | 5/2004 | Autrey et al. |
| 6,742,092 B1 | 5/2004 | Huebsch et al. |
| 6,748,504 B2 | 6/2004 | Sawdon et al. |
| 6,751,635 B1 | 6/2004 | Chen et al. |
| 6,757,794 B2 | 6/2004 | Cabrera et al. |
| 6,760,723 B2 | 7/2004 | Oshinsky et al. |
| 6,763,351 B1 | 7/2004 | Subramaniam et al. |
| 6,789,161 B1 | 9/2004 | Blendermann et al. |
| 6,792,472 B1 | 9/2004 | Otterness et al. |
| 6,792,518 B2 | 9/2004 | Armangau et al. |
| 6,799,258 B1 | 9/2004 | Linde |
| 6,820,035 B1 | 11/2004 | Zahavi |
| 6,836,779 B2 | 12/2004 | Poulin |
| 6,839,724 B2 | 1/2005 | Manchanda et al. |
| 6,871,163 B2 | 3/2005 | Hiller et al. |
| 6,871,271 B2 | 3/2005 | Ohran et al. |
| 6,880,051 B2 | 4/2005 | Timpanaro-Perrotta |
| 6,886,020 B1 | 4/2005 | Zahavi et al. |
| 6,892,211 B2 | 5/2005 | Hitz et al. |
| 6,912,482 B2 | 6/2005 | Kaiser |
| 6,925,476 B1 | 8/2005 | Multer et al. |
| 6,925,512 B2 | 8/2005 | Louzoun et al. |
| 6,938,135 B1 | 8/2005 | Kekre et al. |
| 6,938,180 B1 | 8/2005 | Dysert et al. |
| 6,941,393 B2 | 9/2005 | Secatch |
| 6,944,796 B2 | 9/2005 | Joshi et al. |
| 6,952,705 B2 | 10/2005 | Knoblock et al. |
| 6,952,758 B2 | 10/2005 | Chron et al. |
| 6,954,834 B2 | 10/2005 | Slater et al. |
| 6,968,351 B2 | 11/2005 | Butterworth |
| 6,973,553 B1 | 12/2005 | Archibald, Jr. et al. |
| 6,978,265 B2 | 12/2005 | Schumacher |
| 6,981,177 B2 | 12/2005 | Beattie |
| 6,983,351 B2 | 1/2006 | Gibble et al. |
| 6,993,539 B2 | 1/2006 | Federwisch et al. |
| 7,003,519 B1 | 2/2006 | Biettron et al. |
| 7,003,641 B2 | 2/2006 | Prahlad et al. |
| 7,007,046 B2 | 2/2006 | Manley et al. |
| 7,032,131 B2 | 4/2006 | Lubbers et al. |
| 7,035,880 B1 | 4/2006 | Crescenti et al. |
| 7,039,661 B1 | 5/2006 | Ranade |
| 7,051,050 B2 | 5/2006 | Chen et al. |
| 7,062,761 B2 | 6/2006 | Slavin et al. |
| 7,065,538 B2 | 6/2006 | Aronoff et al. |
| 7,068,597 B1 | 6/2006 | Fijolek et al. |
| 7,082,441 B1 | 7/2006 | Zahavi et al. |
| 7,085,787 B2 | 8/2006 | Beier et al. |
| 7,085,904 B2 | 8/2006 | Mizuno et al. |
| 7,093,012 B2 | 8/2006 | Olstad et al. |
| 7,096,315 B2 | 8/2006 | Takeda et al. |
| 7,103,731 B2 | 9/2006 | Gibble et al. |
| 7,103,740 B1 | 9/2006 | Colgrove et al. |
| 7,106,691 B1 | 9/2006 | Decaluwe et al. |
| 7,107,298 B2 | 9/2006 | Prahlad et al. |
| 7,107,395 B1 | 9/2006 | Ofek et al. |
| 7,111,021 B1 | 9/2006 | Lewis et al. |
| 7,120,757 B2 | 10/2006 | Tsuge |
| 7,130,860 B2 | 10/2006 | Pachet |
| 7,130,970 B2 | 10/2006 | Devassy et al. |
| 7,139,932 B2 | 11/2006 | Watanabe |
| 7,155,465 B2 | 12/2006 | Lee et al. |
| 7,155,633 B2 | 12/2006 | Tuma et al. |
| 7,158,985 B1 | 1/2007 | Liskov |
| 7,177,866 B2 | 2/2007 | Holenstein et al. |
| 7,181,477 B2 | 2/2007 | Saika et al. |
| 7,188,292 B2 | 3/2007 | Cordina et al. |
| 7,191,198 B2 | 3/2007 | Asano et al. |
| 7,194,454 B2 | 3/2007 | Hansen et al. |
| 7,194,487 B1 | 3/2007 | Kekre et al. |
| 7,203,807 B2 | 4/2007 | Urabe et al. |
| 7,209,972 B1 | 4/2007 | Ignatius et al. |
| 7,225,204 B2 | 5/2007 | Manley et al. |
| 7,225,208 B2 | 5/2007 | Midgley et al. |
| 7,225,210 B2 | 5/2007 | Guthrie, II. |
| 7,228,456 B2 | 6/2007 | Lecrone et al. |
| 7,231,391 B2 | 6/2007 | Aronoff et al. |
| 7,231,544 B2 | 6/2007 | Tan et al. |
| 7,234,115 B1 | 6/2007 | Sprauve et al. |
| 7,246,140 B2 | 7/2007 | Therrien et al. |
| 7,246,207 B2 | 7/2007 | Kottomtharayil |
| 7,257,689 B1 | 8/2007 | Baird |
| 7,269,612 B2 | 9/2007 | Devarakonda et al. |
| 7,269,641 B2 | 9/2007 | Powers et al. |
| 7,272,606 B2 | 9/2007 | Borthakur et al. |
| 7,275,138 B2 | 9/2007 | Saika |
| 7,275,177 B2 | 9/2007 | Armangau et al. |
| 7,278,142 B2 | 10/2007 | Bandhole et al. |
| 7,284,153 B2 | 10/2007 | Okbay et al. |
| 7,287,047 B2 | 10/2007 | Kavuri |
| 7,293,133 B1 | 11/2007 | Colgrove et al. |
| 7,296,125 B2 | 11/2007 | Ohran |
| 7,315,923 B2 | 1/2008 | Retnamma et al. |
| 7,318,134 B1 | 1/2008 | Oliveira et al. |
| 7,340,652 B2 | 3/2008 | Jarvis et al. |
| 7,343,356 B2 | 3/2008 | Prahlad et al. |
| 7,343,365 B2 | 3/2008 | Farnham et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,356,657 B2 | 4/2008 | Mikami |
| 7,359,917 B2 | 4/2008 | Winter et al. |
| 7,363,444 B2 | 4/2008 | Ji |
| 7,370,232 B2 | 5/2008 | Safford |
| 7,373,364 B1 | 5/2008 | Chapman |
| 7,380,072 B2 | 5/2008 | Kottomtharayil et al. |
| 7,389,311 B1 | 6/2008 | Crescenti et al. |
| 7,392,360 B1 | 6/2008 | Aharoni et al. |
| 7,395,282 B1 | 7/2008 | Crescenti et al. |
| 7,401,064 B1 | 7/2008 | Arone et al. |
| 7,409,509 B2 | 8/2008 | Devassy et al. |
| 7,415,488 B1 | 8/2008 | Muth et al. |
| 7,428,657 B2 | 9/2008 | Yamasaki |
| 7,430,587 B2 | 9/2008 | Malone et al. |
| 7,433,301 B2 | 10/2008 | Akahane et al. |
| 7,440,982 B2 | 10/2008 | Lu et al. |
| 7,454,569 B2 | 11/2008 | Kavuri et al. |
| 7,461,230 B1 | 12/2008 | Gupta et al. |
| 7,464,236 B2 | 12/2008 | Sano et al. |
| 7,467,167 B2 | 12/2008 | Patterson |
| 7,467,267 B1 | 12/2008 | Mayock |

(56) References Cited

U.S. PATENT DOCUMENTS

| | | |
|---|---|---|
| 7,469,262 B2 | 12/2008 | Baskaran et al. |
| 7,472,238 B1 | 12/2008 | Gokhale |
| 7,472,312 B2 | 12/2008 | Jarvis et al. |
| 7,475,284 B2 | 1/2009 | Koike |
| 7,484,054 B2 | 1/2009 | Kottomtharayil et al. |
| 7,490,207 B2 | 2/2009 | Amarendran |
| 7,496,589 B1 | 2/2009 | Jain et al. |
| 7,496,690 B2 | 2/2009 | Beverly et al. |
| 7,500,053 B1 | 3/2009 | Kavuri et al. |
| 7,500,150 B2 | 3/2009 | Sharma et al. |
| 7,502,902 B2 | 3/2009 | Sato |
| 7,509,316 B2 | 3/2009 | Greenblatt et al. |
| 7,512,601 B2 | 3/2009 | Cucerzan et al. |
| 7,516,088 B2 | 4/2009 | Johnson et al. |
| 7,519,726 B2 | 4/2009 | Palliyll et al. |
| 7,523,483 B2 | 4/2009 | Dogan |
| 7,529,745 B2 | 5/2009 | Ahluwalia et al. |
| 7,529,748 B2 | 5/2009 | Wen et al. |
| 7,529,782 B2 | 5/2009 | Prahlad et al. |
| 7,529,898 B2 | 5/2009 | Nguyen et al. |
| 7,532,340 B2 | 5/2009 | Koppich et al. |
| 7,533,181 B2 | 5/2009 | Dawson et al. |
| 7,536,291 B1 | 5/2009 | Retnamma et al. |
| 7,539,707 B2 | 5/2009 | Prahlad et al. |
| 7,539,835 B2 | 5/2009 | Kaiser |
| 7,543,125 B2 | 6/2009 | Gokhale |
| 7,546,324 B2 | 6/2009 | Prahlad et al. |
| 7,546,364 B2 | 6/2009 | Raman et al. |
| 7,565,572 B2 | 7/2009 | Yamasaki |
| 7,581,077 B2 | 8/2009 | Ignatius et al. |
| 7,593,966 B2 | 9/2009 | Therrien et al. |
| 7,596,586 B2 | 9/2009 | Gokhale et al. |
| 7,606,841 B1 | 10/2009 | Ranade |
| 7,606,844 B2 | 10/2009 | Kottomtharayil |
| 7,613,748 B2 | 11/2009 | Brockway et al. |
| 7,613,750 B2 | 11/2009 | Valiyaparambil et al. |
| 7,617,253 B2 | 11/2009 | Prahlad et al. |
| 7,617,262 B2 | 11/2009 | Prahlad et al. |
| 7,617,321 B2 | 11/2009 | Clark |
| 7,617,369 B1 | 11/2009 | Bezbaruah et al. |
| 7,617,541 B2 | 11/2009 | Plotkin et al. |
| 7,627,598 B1 | 12/2009 | Burke |
| 7,627,617 B2 | 12/2009 | Kavuri et al. |
| 7,636,743 B2 | 12/2009 | Erofeev |
| 7,651,593 B2 | 1/2010 | Prahlad et al. |
| 7,661,028 B2 | 2/2010 | Erofeev |
| 7,668,798 B2 | 2/2010 | Scanlon et al. |
| 7,669,029 B1 | 2/2010 | Mishra et al. |
| 7,685,126 B2 | 3/2010 | Patel et al. |
| 7,689,467 B1 | 3/2010 | Belanger et al. |
| 7,702,533 B2 | 4/2010 | Barnard et al. |
| 7,702,670 B1 | 4/2010 | Duprey et al. |
| 7,707,184 B1 | 4/2010 | Zhang et al. |
| 7,716,171 B2 | 5/2010 | Kryger |
| 7,734,715 B2 | 6/2010 | Hyakutake et al. |
| 7,739,235 B2 | 6/2010 | Rousseau et al. |
| 7,810,067 B2 | 10/2010 | Kaelicke et al. |
| 7,831,553 B2 | 11/2010 | Prahlad et al. |
| 7,831,622 B2 | 11/2010 | Prahlad et al. |
| 7,840,533 B2 | 11/2010 | Prahlad et al. |
| 7,840,537 B2 | 11/2010 | Gokhale et al. |
| 7,870,355 B2 | 1/2011 | Erofeev |
| 7,904,681 B1 | 3/2011 | Bappe |
| 7,930,476 B1 | 4/2011 | Castelli et al. |
| 7,962,455 B2 | 6/2011 | Erofeev |
| 7,962,709 B2 | 6/2011 | Agrawal |
| 8,005,795 B2 | 8/2011 | Galipeau et al. |
| 8,024,294 B2 | 9/2011 | Kottomtharayil |
| 8,121,983 B2 | 2/2012 | Prahlad et al. |
| 8,166,263 B2 | 4/2012 | Prahlad |
| 8,190,565 B2 | 5/2012 | Prahlad et al. |
| 8,195,623 B2 | 6/2012 | Prahlad et al. |
| 8,204,859 B2 | 6/2012 | Ngo |
| 8,219,524 B2 | 7/2012 | Gokhale |
| 8,271,830 B2 | 9/2012 | Erofeev |
| 8,285,684 B2 | 10/2012 | Prahlad et al. |
| 8,352,422 B2 | 1/2013 | Prahlad et al. |
| 8,463,751 B2 | 6/2013 | Kottomtharayil |
| 8,489,656 B2 | 7/2013 | Erofeev |
| 8,504,515 B2 | 8/2013 | Prahlad et al. |
| 8,504,517 B2 | 8/2013 | Agrawal |
| 8,572,038 B2 | 10/2013 | Erofeev |
| 8,589,347 B2 | 11/2013 | Erofeev |
| 2001/0029512 A1 | 10/2001 | Oshinsky et al. |
| 2001/0029517 A1 | 10/2001 | De Meno et al. |
| 2001/0032172 A1 | 10/2001 | Moulinet et al. |
| 2001/0035866 A1 | 11/2001 | Finger et al. |
| 2001/0042222 A1 | 11/2001 | Kedem et al. |
| 2001/0044807 A1 | 11/2001 | Kleiman et al. |
| 2002/0002557 A1 | 1/2002 | Straube et al. |
| 2002/0004883 A1 | 1/2002 | Nguyen et al. |
| 2002/0019909 A1 | 2/2002 | D'Errico |
| 2002/0023051 A1 | 2/2002 | Kunzle et al. |
| 2002/0040376 A1 | 4/2002 | Yamanaka et al. |
| 2002/0042869 A1 | 4/2002 | Tate et al. |
| 2002/0049626 A1 | 4/2002 | Mathias et al. |
| 2002/0049718 A1 | 4/2002 | Kleiman et al. |
| 2002/0049738 A1 | 4/2002 | Epstein |
| 2002/0049778 A1 | 4/2002 | Bell et al. |
| 2002/0062230 A1 | 5/2002 | Morag et al. |
| 2002/0069324 A1 | 6/2002 | Gerasimov et al. |
| 2002/0083055 A1 | 6/2002 | Pachet et al. |
| 2002/0091712 A1 | 7/2002 | Martin et al. |
| 2002/0103848 A1 | 8/2002 | Giacomini et al. |
| 2002/0107877 A1 | 8/2002 | Whiting et al. |
| 2002/0112134 A1 | 8/2002 | Ohran et al. |
| 2002/0120741 A1 | 8/2002 | Webb et al. |
| 2002/0124137 A1 | 9/2002 | Ulrich et al. |
| 2002/0133511 A1 | 9/2002 | Hostetter et al. |
| 2002/0133512 A1 | 9/2002 | Milillo et al. |
| 2002/0161753 A1 | 10/2002 | Inaba et al. |
| 2002/0174107 A1 | 11/2002 | Poulin |
| 2002/0174416 A1 | 11/2002 | Bates et al. |
| 2002/0181395 A1 | 12/2002 | Foster et al. |
| 2003/0005119 A1 | 1/2003 | Mercier et al. |
| 2003/0018657 A1 | 1/2003 | Monday |
| 2003/0023893 A1 | 1/2003 | Lee et al. |
| 2003/0028736 A1 | 2/2003 | Berkowitz et al. |
| 2003/0033308 A1 | 2/2003 | Patel et al. |
| 2003/0061491 A1 | 3/2003 | Jaskiewicz et al. |
| 2003/0079018 A1 | 4/2003 | Lolayekar et al. |
| 2003/0097296 A1 | 5/2003 | Putt |
| 2003/0126200 A1 | 7/2003 | Wolff |
| 2003/0131278 A1 | 7/2003 | Fujibayashi |
| 2003/0135783 A1 | 7/2003 | Martin et al. |
| 2003/0161338 A1 | 8/2003 | Ng et al. |
| 2003/0167380 A1 | 9/2003 | Green et al. |
| 2003/0177149 A1 | 9/2003 | Coombs |
| 2003/0177321 A1 | 9/2003 | Watanabe |
| 2003/0187847 A1 | 10/2003 | Lubbers et al. |
| 2003/0225800 A1 | 12/2003 | Kavuri |
| 2004/0006572 A1 | 1/2004 | Hoshino et al. |
| 2004/0006578 A1 | 1/2004 | Yu et al. |
| 2004/0010487 A1 | 1/2004 | Prahlad et al. |
| 2004/0015468 A1 | 1/2004 | Beier et al. |
| 2004/0039679 A1 | 2/2004 | Norton et al. |
| 2004/0078632 A1 | 4/2004 | Infante et al. |
| 2004/0098425 A1 | 5/2004 | Wiss et al. |
| 2004/0107199 A1 | 6/2004 | Dairymple et al. |
| 2004/0117438 A1 | 6/2004 | Considine et al. |
| 2004/0117572 A1 | 6/2004 | Welsh et al. |
| 2004/0133634 A1 | 7/2004 | Luke et al. |
| 2004/0139128 A1 | 7/2004 | Becker et al. |
| 2004/0193625 A1 | 9/2004 | Sutoh et al. |
| 2004/0193953 A1 | 9/2004 | Callahan et al. |
| 2004/0205206 A1 | 10/2004 | Naik et al. |
| 2004/0225437 A1 | 11/2004 | Endo et al. |
| 2004/0230829 A1 | 11/2004 | Dogan et al. |
| 2004/0236958 A1 | 11/2004 | Teicher et al. |
| 2004/0249883 A1 | 12/2004 | Srinivasan et al. |
| 2004/0250033 A1 | 12/2004 | Prahlad et al. |
| 2004/0254919 A1 | 12/2004 | Giuseppini |
| 2004/0260678 A1 | 12/2004 | Verbowski et al. |
| 2004/0267777 A1 | 12/2004 | Sugimura et al. |

(56) References Cited

U.S. PATENT DOCUMENTS

| | | |
|---|---|---|
| 2004/0267835 A1 | 12/2004 | Zwilling et al. |
| 2004/0267836 A1 | 12/2004 | Armangau et al. |
| 2005/0027892 A1 | 2/2005 | McCabe et al. |
| 2005/0033800 A1 | 2/2005 | Kavuri et al. |
| 2005/0044114 A1 | 2/2005 | Kottomtharayil et al. |
| 2005/0060613 A1 | 3/2005 | Cheng et al. |
| 2005/0080928 A1 | 4/2005 | Beverly et al. |
| 2005/0086443 A1 | 4/2005 | Mizuno et al. |
| 2005/0108292 A1 | 5/2005 | Burton et al. |
| 2005/0114406 A1 | 5/2005 | Borthakur et al. |
| 2005/0131900 A1 | 6/2005 | Palliyll et al. |
| 2005/0138306 A1 | 6/2005 | Panchbudhe et al. |
| 2005/0144202 A1 | 6/2005 | Chen |
| 2005/0172073 A1 | 8/2005 | Voigt et al. |
| 2005/0187982 A1 | 8/2005 | Sato |
| 2005/0187992 A1 | 8/2005 | Prahlad et al. |
| 2005/0188109 A1 | 8/2005 | Shiga et al. |
| 2005/0188254 A1 | 8/2005 | Urabe et al. |
| 2005/0193026 A1 | 9/2005 | Prahlad et al. |
| 2005/0198083 A1 | 9/2005 | Saika et al. |
| 2005/0228875 A1 | 10/2005 | Monitzer et al. |
| 2005/0246376 A1 | 11/2005 | Lu et al. |
| 2005/0246510 A1 | 11/2005 | Retnamma et al. |
| 2005/0254456 A1 | 11/2005 | Sakai |
| 2005/0268068 A1 | 12/2005 | Ignatius et al. |
| 2006/0005048 A1 | 1/2006 | Osaki et al. |
| 2006/0010154 A1 | 1/2006 | Prahlad et al. |
| 2006/0010227 A1 | 1/2006 | Atluri |
| 2006/0010341 A1 | 1/2006 | Kodama |
| 2006/0020616 A1 | 1/2006 | Hardy et al. |
| 2006/0034454 A1 | 2/2006 | Damgaard et al. |
| 2006/0047805 A1 | 3/2006 | Byrd et al. |
| 2006/0047931 A1 | 3/2006 | Saika |
| 2006/0092861 A1 | 5/2006 | Corday et al. |
| 2006/0107089 A1 | 5/2006 | Jansz et al. |
| 2006/0120401 A1 | 6/2006 | Harada et al. |
| 2006/0129537 A1 | 6/2006 | Torii et al. |
| 2006/0136685 A1 | 6/2006 | Griv et al. |
| 2006/0155946 A1 | 7/2006 | Ji |
| 2006/0171315 A1 | 8/2006 | Choi et al. |
| 2006/0174075 A1 | 8/2006 | Sutoh |
| 2006/0215564 A1 | 9/2006 | Breitgand et al. |
| 2006/0230244 A1 | 10/2006 | Amarendran et al. |
| 2006/0242371 A1 | 10/2006 | Shono et al. |
| 2006/0242489 A1 | 10/2006 | Brockway et al. |
| 2007/0033437 A1 | 2/2007 | Kawamura |
| 2007/0043956 A1 | 2/2007 | El Far et al. |
| 2007/0050547 A1 | 3/2007 | Sano |
| 2007/0055737 A1 | 3/2007 | Yamashita et al. |
| 2007/0094467 A1 | 4/2007 | Yamasaki |
| 2007/0100867 A1 | 5/2007 | Celik et al. |
| 2007/0112897 A1 | 5/2007 | Asano et al. |
| 2007/0113006 A1 | 5/2007 | Elliott et al. |
| 2007/0124347 A1 | 5/2007 | Vivian et al. |
| 2007/0124348 A1 | 5/2007 | Claborn et al. |
| 2007/0130373 A1 | 6/2007 | Kalwitz |
| 2007/0143371 A1 | 6/2007 | Kottomtharayil |
| 2007/0143756 A1 | 6/2007 | Gokhale |
| 2007/0179990 A1 | 8/2007 | Zimran et al. |
| 2007/0183224 A1 | 8/2007 | Erofeev |
| 2007/0185852 A1 | 8/2007 | Erofeev |
| 2007/0185937 A1 | 8/2007 | Prahlad et al. |
| 2007/0185938 A1 | 8/2007 | Prahlad et al. |
| 2007/0185939 A1 | 8/2007 | Prahland et al. |
| 2007/0185940 A1 | 8/2007 | Prahlad et al. |
| 2007/0186042 A1 | 8/2007 | Kottomtharayil et al. |
| 2007/0186068 A1 | 8/2007 | Agrawal |
| 2007/0198602 A1 | 8/2007 | Ngo et al. |
| 2007/0226438 A1 | 9/2007 | Erofeev |
| 2007/0244571 A1 | 10/2007 | Wilson et al. |
| 2007/0260609 A1 | 11/2007 | Tulyani |
| 2007/0276848 A1 | 11/2007 | Kim |
| 2007/0288536 A1 | 12/2007 | Sen et al. |
| 2008/0016126 A1 | 1/2008 | Kottomtharayil et al. |
| 2008/0016293 A1 | 1/2008 | Saika |
| 2008/0028009 A1 | 1/2008 | Ngo |
| 2008/0059515 A1 | 3/2008 | Fulton |
| 2008/0077634 A1 | 3/2008 | Quakenbush |
| 2008/0103916 A1 | 5/2008 | Camarador et al. |
| 2008/0104357 A1 | 5/2008 | Kim et al. |
| 2008/0114815 A1 | 5/2008 | Sutoh |
| 2008/0147878 A1 | 6/2008 | Kottomtharayil et al. |
| 2008/0183775 A1 | 7/2008 | Prahlad et al. |
| 2008/0205301 A1 | 8/2008 | Burton et al. |
| 2008/0208933 A1 | 8/2008 | Lyon |
| 2008/0228987 A1 | 9/2008 | Yagi |
| 2008/0229037 A1 | 9/2008 | Bunte et al. |
| 2008/0243914 A1 | 10/2008 | Prahlad et al. |
| 2008/0243957 A1 | 10/2008 | Prahlad et al. |
| 2008/0243958 A1 | 10/2008 | Prahlad et al. |
| 2008/0244205 A1 | 10/2008 | Amano et al. |
| 2008/0250178 A1 | 10/2008 | Haustein et al. |
| 2008/0306954 A1 | 12/2008 | Hornqvist |
| 2008/0313497 A1 | 12/2008 | Hirakawa |
| 2009/0013014 A1 | 1/2009 | Kern |
| 2009/0044046 A1 | 2/2009 | Yamasaki |
| 2009/0113056 A1 | 4/2009 | Tameshige et al. |
| 2009/0150462 A1 | 6/2009 | McClanahan et al. |
| 2009/0182963 A1 | 7/2009 | Prahlad et al. |
| 2009/0187944 A1 | 7/2009 | White et al. |
| 2009/0319534 A1 | 12/2009 | Gokhale |
| 2009/0319585 A1 | 12/2009 | Gokhale |
| 2010/0005259 A1 | 1/2010 | Prahlad |
| 2010/0049753 A1 | 2/2010 | Prahlad et al. |
| 2010/0094808 A1 | 4/2010 | Erofeev |
| 2010/0100529 A1 | 4/2010 | Erofeev |
| 2010/0122053 A1 | 5/2010 | Prahlad et al. |
| 2010/0131461 A1 | 5/2010 | Prahlad et al. |
| 2010/0131467 A1 | 5/2010 | Prahlad et al. |
| 2010/0145909 A1 | 6/2010 | Ngo |
| 2010/0153338 A1 | 6/2010 | Ngo et al. |
| 2010/0179941 A1 | 7/2010 | Agrawal et al. |
| 2010/0205150 A1 | 8/2010 | Prahlad et al. |
| 2010/0211571 A1 | 8/2010 | Prahlad et al. |
| 2011/0066599 A1 | 3/2011 | Prahlad et al. |
| 2011/0246429 A1 | 10/2011 | Prahlad et al. |
| 2011/0295804 A1 | 12/2011 | Erofeev |
| 2011/0295806 A1 | 12/2011 | Erofeev |
| 2012/0011336 A1 | 1/2012 | Saika |
| 2012/0317074 A1 | 12/2012 | Ngo |
| 2013/0006926 A1 | 1/2013 | Erofeev |
| 2013/0006938 A1 | 1/2013 | Prahlad et al. |
| 2013/0006942 A1 | 1/2013 | Prahlad et al. |
| 2013/0254166 A1 | 9/2013 | Kottomtharayil |

FOREIGN PATENT DOCUMENTS

| | | |
|---|---|---|
| EP | 0259912 | 3/1988 |
| EP | 0405926 | 1/1991 |
| EP | 0467546 | 1/1992 |
| EP | 0774715 | 5/1997 |
| EP | 0809184 | 11/1997 |
| EP | 0862304 | 9/1998 |
| EP | 0899662 | 3/1999 |
| EP | 0981090 | 2/2000 |
| EP | 1174795 | 1/2002 |
| EP | 1349089 | 1/2003 |
| EP | 1349088 | 10/2003 |
| EP | 1579331 | 9/2005 |
| EP | 1974296 | 10/2008 |
| GB | 2256952 | 12/1992 |
| GB | 2411030 | 8/2005 |
| JP | 05189281 | 7/1993 |
| JP | 06274605 | 9/1994 |
| JP | 09016463 | 1/1997 |
| JP | 11259348 | 9/1999 |
| JP | 200347811 | 12/2000 |
| WO | WO 93/03549 | 2/1993 |
| WO | WO 95/13580 | 5/1995 |
| WO | WO 98/39707 | 9/1998 |
| WO | WO 99/12098 | 3/1999 |
| WO | WO 99/14692 | 3/1999 |
| WO | WO 02/095632 | 11/2002 |
| WO | WO 03/028183 | 4/2003 |

(56) References Cited

FOREIGN PATENT DOCUMENTS

| WO | WO 2004/034197 | 4/2004 |
|---|---|---|
| WO | WO 2005/055093 | 6/2005 |
| WO | WO 2005/086032 | 9/2005 |
| WO | WO 2007/053314 | 5/2007 |
| WO | WO 2010/068570 | 6/2010 |

OTHER PUBLICATIONS

Arneson, "Development of Onnniserver; Mass Storage Systems," Control Data Corporation, 1990, pp. 88-93.
Arneson, "Mass Storage Archiving in Network Environments" IEEE, 1998, pp. 45-50.
Arneson, David A., Control Data Corporation, Development of Omniserver; Mass Storage Systems, 1990, pp. 88-93.
Ashton, et al., "Two Decades of policy-based storage management for the IBM mainframe computer", www.research.ibm.conn, 19 pages, published Apr. 10, 2003, printed Jan. 3, 2009., www.research.ibm.conn, Apr. 10, 2003, pp. 19.
Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Calvert, Andrew, "SQL Server 2005 Snapshots", published Apr. 3, 2006, http:/www.simple-talk.com/contnet/print.aspx?article=137, 6 pages.
Eitel, "Backup and Storage Management in Distributed Heterogeneous Environments," IEEE, 1994, pp. 124-126.
Gait, "The Optical File Cabinet: A Random-Access File system for Write-Once Optical Disks," IEEE Computer, vol. 21, No. 6, pp. 11-22 (1988).
Gray, et al. "Transaction processing: concepts andtechniques" 1994, Morgan Kaufmann Publishers, USA, pp. 604-609, 646-655.B7.
Harrington, "The RFP Process: How to Hire a Third Party", Transportation & Distribution, Sep. 1988, vol. 39, Issue 9, in 5 pages.
http://en.wikipedia.org/wiki/Naive_Bayes_classifier, printed on Jun. 1, 2010, in 7 pages.
Dander, "Launching Storage-Area Net," Data Communications, US, McGraw Hill, NY, vol. 27, No. 4(Mar. 21, 1998), pp. 64-72.
Kashyap, et al., "Professional Services Automation: A knowledge Mangement approach using LSI and Domain specific Ontologies", FLAIRS-01 Proceedings, 2001, pp. 300-302.
Lyon J., Design considerations in replicated database systems for disaster protection, COMPCON 1988, Feb. 29, 1988, pp. 428-430.
Microsoft Corporation, "Microsoft Exchange Server: Best Practices for Exchange Database Management," 1998.
Rosenblum et al., "The Design and Implementation of a Log-Structure File System," Operating Systems Review SIGOPS, vol. 25, No. 5, New York, US, pp. 1-15 (May 1991).
The Oracle8 Replication Manual, Part No. A58245-01; Chapters 1-2; Dec. 1, 1997; obtained from website: http://download-west.oracle.com/docs/cd/A64702_01/doc/server.805/a58245/toc.htm on May 20, 2009.
Veritas Software Corporation, "Veritas Volume Manager 3.2, Administrator's Guide," Aug. 2001, 360 pages.
Wiesmann M, Database replication techniques: a three parameter classification, Oct. 16, 2000, pp. 206-215.
Final Office Action for Japanese Application No. 2003531581, Mail Date Mar. 24, 2009, 6 pages.
International Search Report and Written Opinion dated Nov. 13, 2009, PCT/US2007/081681.
First Office Action for Japanese Application No. 2003531581, Mail Date Jul. 8, 2008, 8 pages.
International Preliminary Report on Patentability, PCT Application No. PCT/US2009/066880, mailed Jun. 23, 2011, in 9 pages.
International Search Report and Written Opinion issued in PCT Application No. PCT/US2011/030396, mailed Jul. 18, 2011, in 20 pages.
International Search Report and Written Opinion issued in PCT Application No. PCT/US2011/38436, mailed Sep. 21, 2011, in 18 pages.
Canadian Office Action dated Sep. 24, 2012, Application No. 2,632,935, 2 pages.
European Examination Report; Application No. 06848901.2, Apr. 1, 2009, pp. 7.
Examiner's First Report ; Application No. 2006331932, May 11, 2011 in 2 pages.
Canadian Office Action dated Dec. 29, 2010, Application No. CA2546304.
Examiner's Report for Australian Application No. 2003279847, Dated Dec. 9, 2008, 4 pages.
First Office Action in Canadian application No. 2,632,935 dated Feb. 16, 2012, 5 pages.
International Search Report dated May 15, 2007, PCT/US2006/048273.
Second Examination Report in EU Appl. No. 06 848 901.2-2201 dated Dec. 3, 2010.
International Search Report and Written Opinion dated Mar. 25, 2010, PCT/US2009/066880.
International Preliminary Report on Patentability and Written Opinion in PCT/US2011/030396 mailed Oct. 2, 2012.
International Preliminary Report on Patentability and Written Opinion in PCT/US2011/038436 mailed Dec. 4, 2012.
International Search Report dated Dec. 28, 2009, PCT/US204/038324.
International Search Report and Written Opinion dated Jan. 11, 2006, PCT/US2004/038455.
Exam Report in Australian Application No. 2009324800 dated Jun. 17, 2013.
IBM, "Intelligent Selection of Logs Required During Recovery Processing", ip.com, Sep. 16, 2002, 4 pages.
IBM, "Near Zero Impact Backup and Data Replication Appliance", ip.com, Oct. 18, 2004, 5 pages.
Park et al., "An Efficient Logging Scheme for Recoverable Distributed Shared Memory Systems", IEEE, 1997, 9 pages.

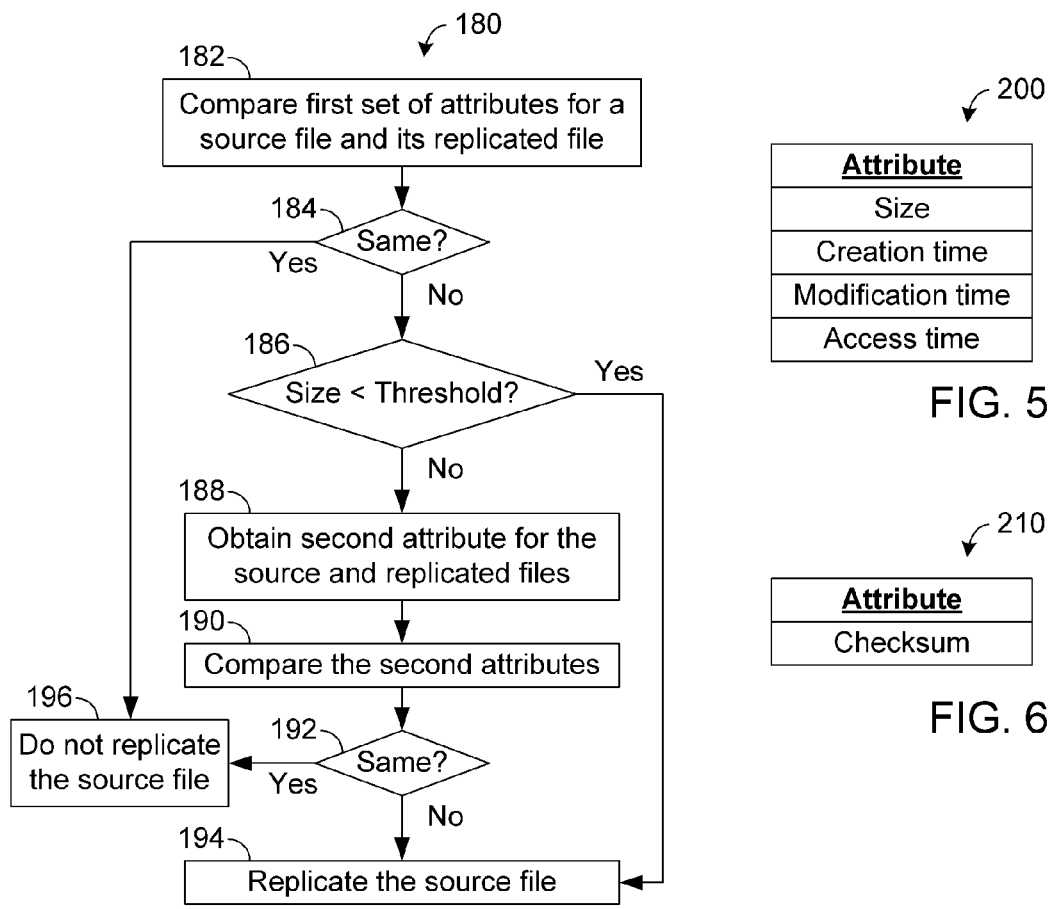
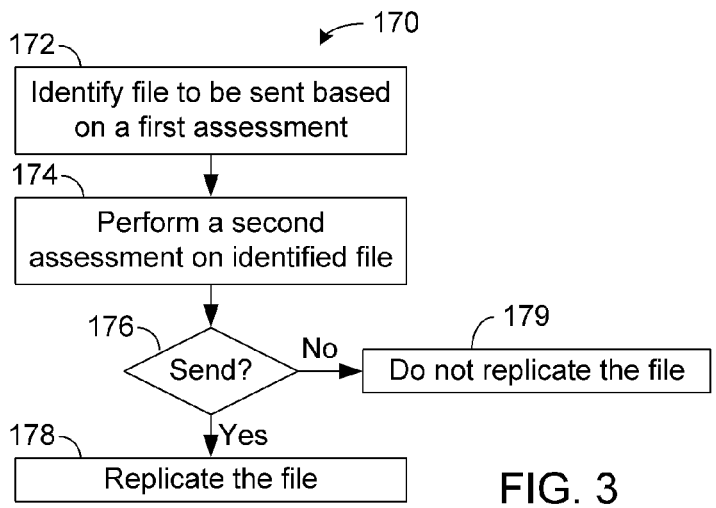
FIG. 3
FIG. 4
FIG. 5
FIG. 6

SYSTEMS AND METHODS FOR SELECTIVE DATA REPLICATION

RELATED APPLICATIONS

The present application is a continuation of U.S. patent application Ser. No. 12/749,280, filed Mar. 29, 2010, which is hereby incorporated herein by reference in its entirety.

BACKGROUND

1. Field

The present disclosure relates to copy and/or data management operations in a computer network and, in particular, to systems and methods for performing data replication in a storage management system.

2. Description of the Related Art

Computers have become an integral part of business operations such that many banks, insurance companies, brokerage firms, financial service providers, and a variety of other businesses rely on computer networks to store, manipulate, and display information that is constantly subject to change. Oftentimes, the success or failure of an important transaction may turn on the availability of information that is both accurate and current. Accordingly, businesses worldwide recognize the commercial value of their data and seek reliable, cost-effective ways to protect the information stored on their computer networks.

Many approaches to protecting data involve creating a copy of the data, such as backing up and/or replicating data on one or more storage devices. Data shadowing and mirroring, or duplexing, provide for copying but can require substantial amounts of time, processing power and/or storage space, especially for large databases. Moreover, such storage management systems can have a significant adverse impact on the performance of the source or primary system.

To address these drawbacks, certain systems perform replication operations that copy less than an entire volume of data to a desired location. For example, differential replication operations are used to copy all files that have changed since a last full replication of the data. Moreover, incremental replication operations can be used to copy all files that have changed since the most recent full, differential or incremental replication. These techniques, however, can require a significant amount of processing power or network bandwidth, especially when dealing with changes to relatively large files or databases.

SUMMARY

In certain embodiments, the present disclosure relates to a method for performing data replication. The method includes performing an assessment on first data stored on a first storage device and second data stored on a second storage device, where at least a portion of the second data was previously replicated from the first data. The assessment includes comparing one or more attributes of files in the first data with those of corresponding files in the second data, and identifying a file having at least one of the one or more attributes different in the first and second data. The method further includes comparing the size of the identified file with a selected threshold value. If the size of the identified file is less than or equal to the selected threshold value, the identified file is replicated from the first storage device to the second storage device. If the size of the identified file is greater than the selected threshold value: checksums is obtained for the identified file in the first data and its corresponding file in the second data; the checksums are compared; if the checksums are different, the identified file is replicated from the first storage device to the second storage device; and if the checksums are the same, the one or more different attributes of the identified file in the first data and the corresponding file in the second data are synchronized, and the identified file is not replicated.

In certain embodiments, the one or more attributes comprise one or more attributes obtainable from metadata. In certain embodiments, the one or more attributes obtainable from metadata comprise at least one attribute selected among file size, file creation time, file modification time, or file access time.

In certain embodiments, the selected threshold value is obtained based on one or more storage policies. In certain embodiments, the one or more storage policies comprise assignment of the selected threshold value based on one or more of type of communication network between the first and second systems, available network resource, or assigned priority.

In certain embodiments, the size of the identified file is selected based on a size of a data block, one or more of the data blocks constituting the identified file.

In certain embodiments, the obtaining of checksums comprises calculating checksums for each of one or more data blocks associated with the identified file and the corresponding file. In certain embodiments, the replicating the identified file comprises replicating only one or more data blocks of the identified file whose checksums are different from those of the corresponding file.

In certain embodiments, the present disclosure relates to a data replication system having a data storage system configured to store replication of at least a portion of data from a client system. The client system is capable of communicating with the data storage system to facilitate transfer of data therebetween. The system further includes a replication agent in communication with the client system and the data storage system and configured to obtain information about an identified file on the client system. The identified file has at least one metadata attribute that is different from that of an existing replicated copy of the identified file on the data storage system. The replication agent is further configured to: obtain a size of the identified file; compare the size of the identified file with a threshold value; if the size is less than or equal to the threshold value, replicate the identified file so as to replace or update the existing replicated copy of the identified file; and if the size is greater than the threshold value, (1) obtain and compare checksums of the identified file and the replicated file, and (2) replicate the identified file so as to replace or update the existing replicated copy of the identified file if the checksums are different.

In certain embodiments, the replication agent is further configured to reconcile the metadata difference between the identified and replicated files but not replicate the identified file if the checksums of the identified file and the replicated file are the same.

In certain embodiments, the threshold value is obtained based on one or more storage policies, a type of communication network between the client system and the data storage system, one or more network resources associated with the communication network, or a priority assigned to the replication agent.

In certain embodiments, the threshold value comprises 256 kilobytes, 2 megabytes, or another operating-system dependent value.

In certain embodiments, the system further includes a user interface configured to receive user input indicative of the threshold value.

In certain embodiments, the replication agent comprises a software application executable on the client system.

In certain embodiments, the present disclosure relates to a replication system having means for identifying a first file in a first system based on a comparison of one or more attributes of the first file and a second file on a second system, with the second file representing an existing replicated copy of the first file. The system further includes means for comparing the size of the identified file with a threshold value. The system further includes means for determining whether to replicate one or more blocks of the first file to the second file again based at least in part on the size comparison.

In certain embodiments, the means for determining includes means for obtaining and comparing an assessment of contents of the first and second files, and means for selectively replicating data blocks of the first file to the second file based on the assessment of the contents. In certain embodiments, the assessment of contents of the first and second files comprises a calculation of checksums of the first and second file.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 3 illustrates a process that can be implemented in the data replication system to perform a second assessment on files identified for replication.

FIG. 4 illustrates a process that can be implemented as a more specific example of the process of FIG. 3.

FIG. 5 illustrates a listing of non-limiting example file attributes that can be used to identify files for possible replication in a first assessment.

FIG. 6 illustrates a listing of a non-limiting example file parameter that can be used to check the integrity of an existing replicated file.

DETAILED DESCRIPTION OF THE PREFERRED EMBODIMENTS

As disclosed herein, certain systems and methods are provided for data replication. In particular, embodiments of the invention are capable of performing replication of data from a source system to a destination system.

In the description herein, various features and examples are described in the context of data replication. It will be understood that such features and concepts can be applied to various forms of data storage and recovery systems. Accordingly, it will be understood that "replication" can include any processes or configurations where some data representative of a file in a source system is stored or copied to in a destination system, such that the source file can be restored from on the representative data in the destination system. Such representative data can include, for example, a mirror-image data file, a backup format file, etc.

The features of the systems and methods will now be described with reference to the drawings summarized above. Throughout the drawings, reference numbers may be re-used to indicate correspondence between referenced elements. The drawings, associated descriptions, and specific implementation are provided to illustrate embodiments of the invention and not to limit the scope of the disclosure.

In addition, methods and functions described herein are not limited to any particular sequence, and the blocks or states relating thereto can be performed in other sequences that are appropriate. For example, described blocks or states may be performed in an order other than that specifically disclosed, or multiple blocks or states may be combined in a single block or state.

Figure 1:
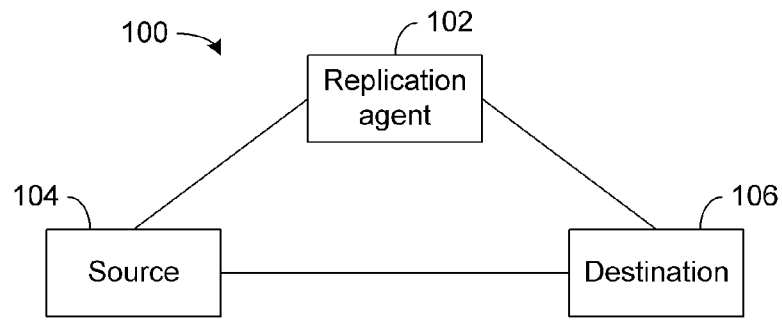
FIG. 1 illustrates a block diagram of a data replication system, according to certain embodiments of the invention.

FIG. 1 schematically depicts a replication system 100 having a source system 104 capable of communicating with a destination system 106 so as to allow transfer of data therebetween. The replication system 100 further includes a replication agent 102 that can be configured to provide one or more functionalities as described herein. The replication agent 102 is depicted as being capable of communicating with the source system 104 and the destination system 106.

In certain embodiments, the replication agent 102 can be any computing device and/or software module that coordinates the transfer of data between the source 104 and destination 106 systems. In certain embodiments, the replication agent can 102 be a software application residing and/or executing on the source system 104, and configured to communicate with an application residing and/or executing on the destination system 106. The application on the destination system 106 can be configured to process data replicated from the source system 104 and provide information about such data to the replication agent 102.

In certain embodiments, the replication agent 102 does not necessarily need to reside and/or execute on the source system 104. Given appropriate information about data on the source system 104 and the destination system 106, the replication agent 102 can provide similar functionalities even when residing and/or executing elsewhere, such as on the destination system 106.

In certain embodiments, the source and destination systems 104 and 106 can be parts of different devices. In certain embodiments, the source system 104 and the destination system 106 can be part of the same computing device, where it may be desirable to replicate data from one system to another.

In certain embodiments, the source system 104 of FIG. 1 can be associated with a variety of computing devices, including but not limited to, a server computer, a workstation, a personal computer including a laptop computer, a cell phone, a portable computing device, a handheld computing device, a personal digital assistant (PDA), combinations of the same or the like.

Figure 2:
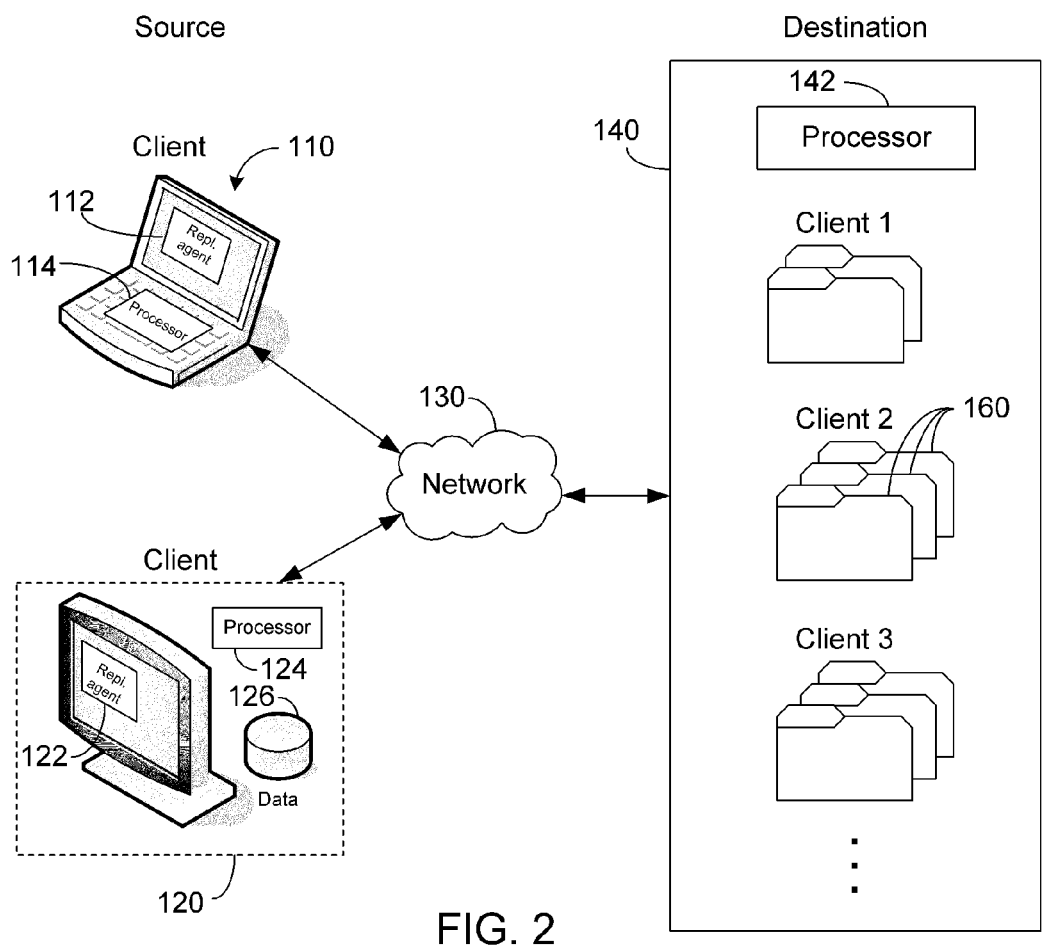
FIG. 2 illustrates an example of the data replication system where a plurality of source systems are in communication with a destination system.

FIG. 2 shows non-limiting examples of the computing devices that can be source systems. For the purpose of description of FIG. 2, it will be assumed that the replication agent resides and/or executes on the source system.

In certain embodiments, the source systems can include a stand-alone computing system such as a laptop computer 110. The example stand-alone computing system 110 can include a processor 114 configured to execute a number of software applications, including a replication agent 112. In the example system 110, data to be replicated can reside in one or more storage devices (not shown) inside of the computer's housing and/or connected to the laptop in known manner.

In certain embodiments, the source systems can include a workstation system 120 having a processor 124 configured to execute a number of software applications, including a replication agent 122. In the example system 120, data to be replicated can reside in one or more storage devices 126 associated with the system 120.

FIG. 2 also shows an example of a destination system 140 having a processor 142 configured to coordinate storage of replicated data. In certain embodiments, the destination system 140 can be part of a data storage service servicing a plurality of clients. Thus, each of the example source systems 110 and 120 can be considered to be a client of the destination system 140.

In certain embodiments, replicated data can be structured and organized so as to facilitate easy retrieval if needed. For example, each client's stored data can be organized in a file structure 160 representative of the client system's file structure. Such data organization and coordination by the processor 142 can be achieved in known manners.

FIG. 2 also shows that transfer of data between a given source system and the destination system 140 can be facilitated by a communication link such as a network 130. In certain embodiments, the network 130 can include any means for communicating data between two or more systems or components. In certain embodiments, the network 130 can include a computer network. For example, the network 130 can include a public network such as the Internet, virtual private network (VPN), a token ring or TCP/IP based network, wide area network (WAN), local area network (LAN), an intranet network, point-to-point link, a wireless network, cellular network, wireless data transmission system, two-way cable system, interactive kiosk network, satellite network, broadband network, baseband network, combinations of the same or the like. In embodiments where the source system and destination system are part of the same computing device, the network 130 may represent a communications socket or other suitable internal data transfer path or mechanism.

As is generally known, replication of a given client's data can begin by a full replication process. Subsequently, the stored data can be updated by replicating selected portions of the data, such as one or more data blocks. In certain embodiments, such selected replication can be based on some change in the data. For example, identification and replication of files can be based on readily obtainable attributes such as creation time, modification time, and access time. In many file systems, such attributes can be part of metadata associated with files. Such selected replication can reduce expenditure of computing and/or network resources by not replicating files that have not changed.

In certain circumstances, a replication process can be made more efficient and reliable overall by performing an additional assessment of a given file that has undergone a first assessment (e.g., the foregoing assessment based on readily obtainable file attribute(s)). Examples of such circumstances are described herein in greater detail.

FIG. 3 shows that in certain embodiments, a second assessment can be performed (e.g., by the replication agent 102 of FIG. 1) on the file identified in the foregoing manner. A process 170 can include a block 172 where a file to be replicated from a source system to a destination system is identified via a first assessment. In certain embodiments, the first assessment can include comparison of attributes (of the source file and its corresponding replicated file) that can be obtained readily—for example, attributes associated with metadata. Such attributes can include file size, creation time, modification time, access time, combinations of the same or the like.

In block 174, a second assessment can be performed on the file identified in block 172. In certain embodiments, the second assessment can include determination of whether to obtain further information about the file. In situations where obtaining such information utilizes significant computing resources, the second assessment can reduce unnecessary expenditure of resources. For example, if the second assessment determines that the resource-consuming information is not needed or desired, expenditure of significant resources can be avoided.

Based on the second assessment of block 174, the process 170 can, in a decision block 176, determine whether the file should be replicated. If the answer is "Yes," the process 170 can replicate the file in block 178. If the answer is "No," the process 170 can determine that the file should not be replicated in block 179.

FIG. 4 shows a process 180 that can be implemented as a more specific example of the process 170 of FIG. 3. In block 182, a first set of attributes for a file in the source system and its replicated file in the destination system can be obtained and compared. FIG. 5 shows a table 200 of non-limiting examples of file attributes that can be obtained and compared in block 182. File size, file creation time, file modification time, and file access time are non-limiting examples of attributes that can be obtained and compared in known manners.

In a decision block 184, the process 180 can determine whether the attributes compared in block 182 are same. If "Yes," the process 180 can determine that the source file should not be replicated in block 196. If "No," the process 180 in a decision block 186 can determine whether the file size (e.g., for the source file) is less than that of a selected threshold value. In certain embodiments, the threshold value can be selected based on balancing of computing and/or bandwidth resource expenditures associated with determination of a second set of one or more attributes (for the source file and the replicated file) and possible replication thereafter, versus direct replication regardless of the second set of attribute(s). For example, if a given file is relatively small, it may be more efficient overall to simply send the file than to subject the file to further assessment. In another example, if a given file is relatively large, it may be worthwhile to further determine whether to send the file before committing significant bandwidth resources. In certain embodiments, the threshold value can be based on a data block size such as 256 KB or 2 MB. In certain embodiments, a data block size that can be used as a threshold value can depend on the operating system in which the process 180 is being performed.

Thus, if the answer to the decision block 186 is "Yes," the process 180 can bypass further assessment and replicate the source file in block 194. If the answer is "No," the process 180 can obtain a second set of one or more attributes for the source and replicated files in block 188. In block 190, the second sets of attribute(s) for the source and replicated files can be compared. FIG. 6 shows a table 210 of a non-limiting example of file attributes that can be obtained and compared in blocks 188 and 190. For example, checksums can be obtained for the source file and the replicated file and compared in known manners.

For the purpose of description, it will be understood that "checksum" (sometimes referred to as "hash sum") can include any datum or data computed from a block of digital data to facilitate detection of errors that may be introduced during replication and/or storage. In the context of replication systems, integrity of data associated with a given block (e.g., a 256 KB block) of a replicated file can be checked by computing the checksum and comparing it with the checksum of the same data block of the source file. In the context of files, a given file can include one or more data blocks. Thus, checksums of the source and replicated files can be compared on a block-by-block basis. Non-limiting examples of checksums can include known algorithms such as rolling checksum (also sometimes referred to as rolling hash function) for block sizes between about 256 KB and 200 MB, and MD5 cryptographic hash function algorithm for larger block sizes.

If the checksums do not match, there is a high likelihood that the data was altered. On the other hand, if the checksums match, it is highly likely that integrity of the data is maintained (e.g., by being substantially error-free). In certain replication situations, comparison of checksums in the foregoing manner can be sufficiently reliable so as to override differences in one or more of the first set of attributes. An example of such overriding feature is described herein in greater detail.

Based on the comparison in block 190, the process 180 can, in a decision block 192, determine whether the second sets of attribute(s) for the source and replicated files are same. If "No," the difference provides further confirmation of change and/or error in the file, and the source file can be replicated in block 194. If "Yes," the process 180 can either decide to not replicate the source file (e.g., based on high reliability of checksum comparison), or replicate the source file (e.g., based on the change in one or more of the first set of attribute(s)). Whether to replicate or not replicate under such circumstances can be based on one or more factors, including, for example, balancing of likelihood of data integrity (confirmed by checksum comparison), versus replication based on the difference(s) of the first sets of attributes. In the example shown in FIG. 4, the process 180 can decide not to replicate the source file in block 196 based on, for example, high reliability of the checksum comparison.

In certain embodiments, replication of the source file in block 194 can include sending of the entire source file from the source system to the destination system if the checksum comparison yields differences in one or more blocks of the source and replicated files. In other embodiments, replication of the source file in block 194 can include sending of only the block(s) having different checksum(s) between the source and replicated files.

Figure 7:
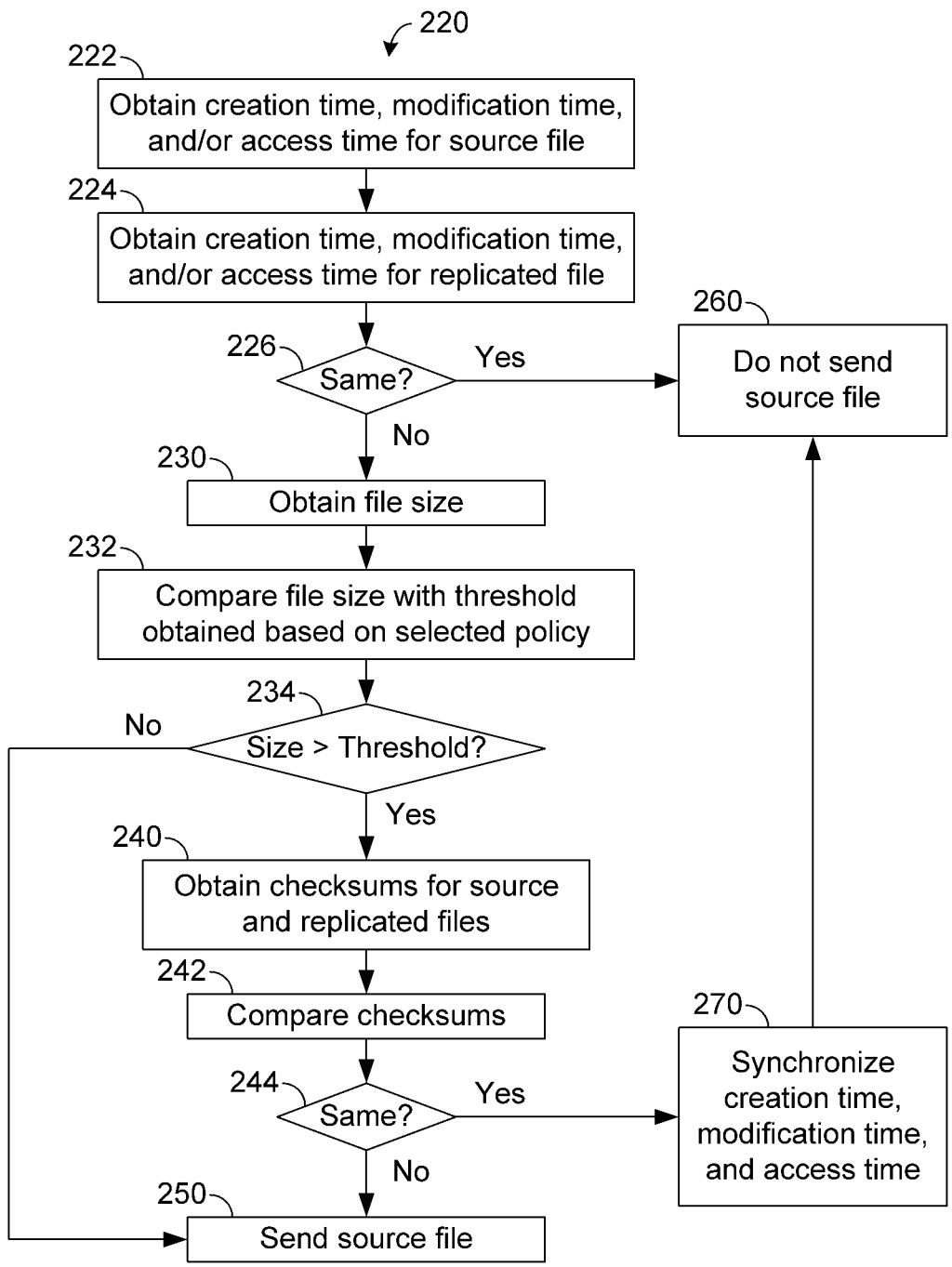
FIG. 7 illustrates a process that can be implemented as a more specific example of the process of FIG. 4.

FIG. 7 shows a process 220 that can be implemented as a more specific example of the process 180 of FIG. 4. In block 222, creation time, modification time, and/or access time for a source file can be obtained. In block 224, the same attribute(s) for a replicated file can be obtained. In certain embodiments, such attributes can be obtained on the source system (e.g., by the processor (114, 124) and/or the replication agent (112, 122) of FIG. 2) and on the destination system (e.g., by the processor 142 of FIG. 2).

In certain embodiments, such attributes can be obtained for files on the destination system in a survey performed periodically or as needed. Information representative of such attributes can be sent to the source system, and the replication agent can perform comparisons with similar information obtained on the source system so as to allow identification of files to be further assessed for replication purpose.

In a decision block 226, the process 220 can determine whether the attributes obtained in blocks 222 and 224 are the same for a given file. If "Yes," the process 220 can determine that the file should not be replicated, and the source file is not sent (block 260). If "No," the process 220 can obtain the size of the file (e.g., size of the source file) in block 230. In block 232, the file size can be compared with a threshold value obtained based on a selected policy. In certain embodiments, such policy can include a setting of threshold file size based on, for example, network type, available network bandwidth, loads placed on the source and/or destination systems, priorities assigned to replication processes, combinations of the same or the like. As described herein, a threshold value can be selected based on balancing of expenditure of various resources associated with checksum calculations for the source and replicated files versus direct replication without the checksum calculations.

In a decision block 234, the process 220 can determine whether the file size is greater than the threshold value. If the answer is "No," the file can be sent (block 250) without further processing. If the answer is "Yes," checksums for the source and replicated files can be obtained in block 240. In certain embodiments, information about the replicated file's checksum can be sent to the source system so as to allow comparison with the source file's checksum.

In block 242, checksums for the source and replicated files can be compared. In a decision block 244, the process 220 can determine whether the two checksums are same. If the answer is "No," the source file can be sent in block 250. In certain embodiments, if the answer is "Yes," the process 220 can determine that the source file should not be sent despite difference(s) in the attributes obtained and compared in blocks 222, 224, and 226. In certain embodiments, such determination can be based on consideration of the likelihood of data integrity as provided by the checksum comparison. In block 270, the process 220 can synchronize the creation time, modification time, and access time attributes of the source and replicated files. For example, such attributes for the replicated file can be updated to match those of the source file. The source file is not sent (block 260).

As described in reference to FIG. 7, a threshold value for determining whether to perform further assessment of a given file (blocks 232, 234) can be assigned based on a selected policy. In certain embodiments, such a policy can be implemented as part of the replication agent (FIGS. 1 and 2), and/or be based on one or more parameters associated with the replication process.

Figure 8:
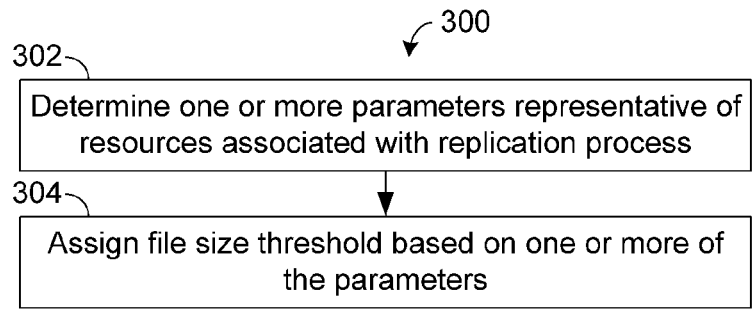
FIG. 8 illustrates a process that can be implemented to assign a file size threshold value to facilitate the second assessment.

FIG. 8 shows that in certain embodiments, a process 300 can be implemented as part of such a policy. In block 302, one or more parameters representative of resources associated with a replication process can be determined. In block 304, a file size threshold value can be assigned based on such one or more parameters.

Figure 9:
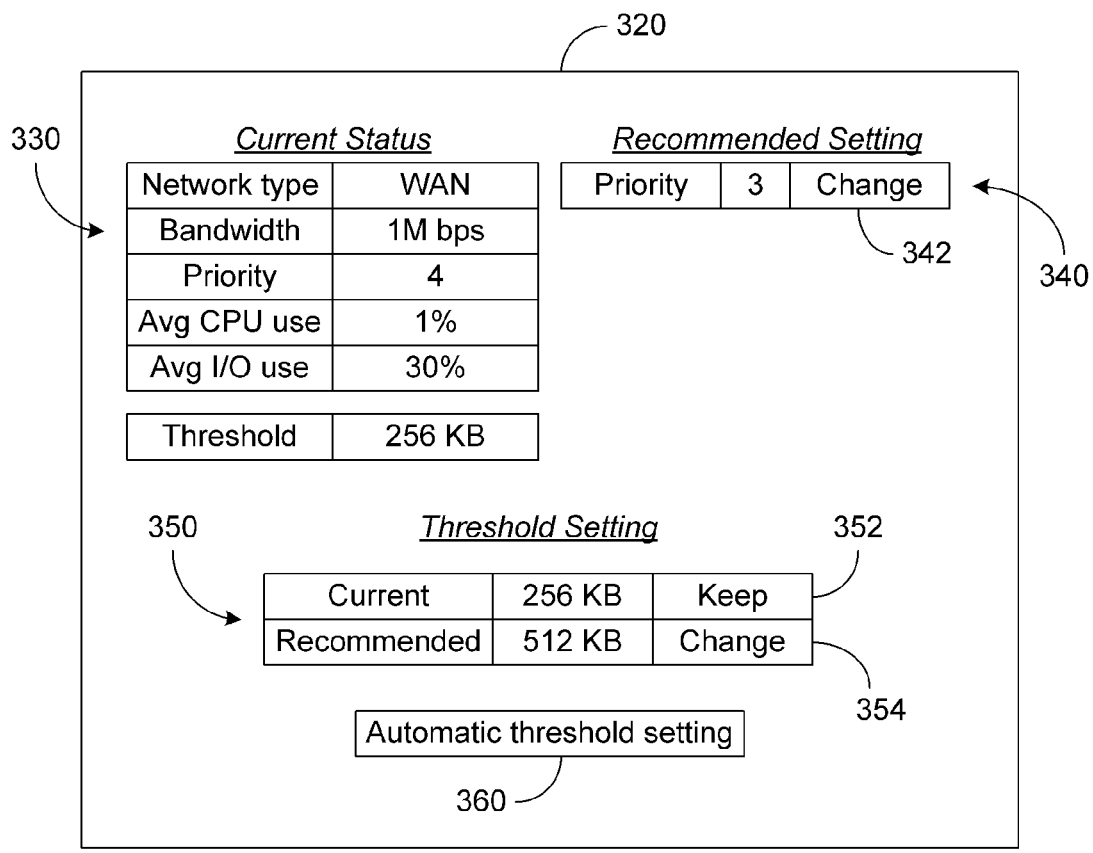
FIG. 9 illustrates an example user interface that can be utilized to facilitate the threshold value assignment process.

FIG. 9 shows non-limiting examples of parameters that can be considered when determining the file size threshold value. In certain embodiments, such parameters can be presented to, for example, a system manager as part of a user interface 320 through which the replication policy can be implemented.

By way of example, the interface 320 can include one or more parameters 330 representative of a current status of the source system, network, and/or destination system. For example, network type, available bandwidth, assigned priority for the replication process, average CPU usage for the replication process, and average I/O usage for the replication process can be presented to the user. Additionally, the current value of the threshold can also be presented to the user.

In certain embodiments, the user interface 320 can include one or more recommendations 340 that can be effectuated by the user. For example, priority setting can be allowed to be changed by the user selecting the "Change" button 342.

In certain embodiments, the user interface 320 can include an option 350 that allows the user to keep 352 or change 354 the threshold value. For example, the change 354 can be to a new threshold value based on one or more parameters 330 as described herein.

In certain embodiments, determination and implementation of the threshold value can be configured to be substantially automatic, based on one or more storage policies, the replication agent's monitoring of the source system, network, and/or destination system. Thus, the example user interface 320 can include an option 360 that allows determination of threshold values based on various operating and resource parameters.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Embodiments of the invention are also described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flowchart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide steps for implementing the acts specified in the flowchart and/or block diagram block or blocks.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions, and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A computer-implemented method for performing data replication, the computer-implemented method comprising:
   performing a first assessment with computer hardware on a first set of files stored on a first storage device that is associated with a source system and on a second set of files stored on a second storage device that is associated with a destination system in networked communication with the source system, the second set of files corresponding to the first set of files and having been previously replicated from the first set of files, the first assessment comprising,
      comparing one or more attributes of the first set of files with one or more corresponding attributes of the second set of files, and
      determining whether a first attribute from the one or more attributes of a file from the first set of files differs from a corresponding attribute of the one or more corresponding attributes of a corresponding file from the second set of files;
   in response to determining that the first attribute differs from the corresponding attribute, determining with the computer hardware whether a size of the file satisfies a size threshold value;
   in response to determining that the size of the file satisfies the size threshold value, performing with the computer hardware a second assessment on the file based at least in part on a checksum for the file; and
   based on the results of the second assessment, determining whether to replicate the file from the first storage device to the second storage device.

2. The computer-implemented method of claim 1, wherein performing the second assessment comprises:
   accessing the checksum for the file;
   accessing a checksum for the corresponding file; and
   comparing the checksum for the file with the checksum for the corresponding file to determine whether the checksum for the file differs from the checksum for the corresponding file.

3. The computer-implemented method of claim 2, wherein, in response to determining that the checksum for the file differs from the checksum for the corresponding file, the method further comprises replicating the file from the first storage device to the second storage device.

4. The computer-implemented method of claim 3, wherein replicating the file comprises replicating data blocks of the file with different checksum values than checksum values of corresponding data blocks of the corresponding file.

5. The computer-implemented method of claim 2, wherein, in response to determining that the checksum for the file matches the checksum for the corresponding file, the method further comprises synchronizing the attribute of the file with the corresponding attribute of the corresponding file without replicating the file from the first storage device to the second storage device.

6. The computer-implemented method of claim 2, wherein accessing the checksum for the file comprises accessing a checksum for each data block of the file and wherein accessing the checksum for the corresponding file comprises accessing a checksum for each data block of the corresponding file.

7. The computer-implemented method of claim 1, wherein the size threshold value is determined based at least in part on balancing processing resource expenditures for performing the second assessment versus bandwidth resources for replicating the file.

8. The computer-implemented method of claim 1, wherein if the size of the file does not satisfy the size threshold value, the file is replicated from the first storage device to the second storage device without performing the second assessment.

9. A data replication system comprising:
a replication agent comprising computer hardware, the replication agent in communication with a source storage system and a destination storage system, the replication agent configured to:
perform a first assessment of a file stored on the source storage system to determine whether the file has a metadata attribute that differs from a corresponding metadata attribute of a corresponding file on the destination storage system;
in response to a determination that the metadata attribute differs from the corresponding metadata attribute, the replication agent is further configured to:
obtain a size of the file; and
compare the size of the file to a size threshold value;
in response to a determination that the size of the file does not satisfy the size threshold value, the replication agent is further configured to replicate the file from the source storage device to the destination storage device regardless of whether a checksum for the file matches a checksum for the corresponding file; and
in response to a determination that the size of the file satisfies the size threshold value, the replication agent is further configured perform a second assessment of the file based at least in part on the checksum for the file.

10. The data replication system of claim 9, wherein the replication agent is further configured to perform the second assessment by:
accessing the checksum for the file;
accessing the checksum for the corresponding file; and
comparing the checksum for the file with the checksum for the corresponding file to determine whether the checksum for the file differs from the checksum for the corresponding file.

11. The data replication system of claim 10, wherein, in response to determining that the checksum for the file differs from the checksum for the corresponding file, the replication agent is further configured to replicate the file from the source storage device to the destination storage device.

12. The data replication system of claim 11, wherein the replication agent is further configured to replicate the file by replicating data blocks of the file with different checksum values than data blocks of the corresponding file.

13. The data replication system of claim 10, wherein, in response to determining that the checksum for the file matches the checksum for the corresponding file, the replication agent is further configured to synchronize the metadata attribute of the file with the corresponding metadata attribute of the corresponding file without replicating the file from the source storage device to the destination storage device.

14. The data replication system of claim 10, wherein accessing the checksum for the file comprises accessing a checksum for each data block of the file and wherein accessing the checksum for the corresponding file comprises accessing a checksum for each data block of the corresponding file.

15. The data replication system of claim 9, wherein the replication agent is further configured to determine the size threshold value based at least in part on balancing processing resource expenditures for performing the second assessment versus bandwidth resources for replicating the file.

16. The data replication system of claim 9, wherein the replication agent is further configured to:
access one or more storage policies; and
determine the size threshold value based at least in part on the one or more storage policies.

17. The data replication system of claim 9, further comprising a data storage system, the data storage system comprising the source storage system and the destination storage system.

18. The data replication system of claim 9, further comprising a user interface configured to receive user input, and wherein the replication agent is further configured to determine the size threshold value based at least in part on the user input.

19. Non-transitory computer storage comprising instructions which, when executed, cause the computing system to perform steps comprising:
performing a first assessment on a first file stored on a first storage device that is associated with a source system and on a second file stored on a second storage device that is associated with a destination system, the second file corresponding to the first file and having been previously replicated from the first file, the first assessment comprising,
comparing an attribute of the first file with a corresponding attribute of the second file, and
determining whether the attribute from the first file differs from the corresponding attribute of the second file;
in response to determining that the attribute differs from the corresponding attribute, determining whether a size of the first file satisfies a threshold value;
in response to determining that the size of the first file satisfies the threshold value, performing a second assessment on the first file based at least in part on the checksum for the first file; and
based on the results of the second assessment, determining whether to replicate the file from the first storage device to the second storage device.

20. The non-transitory computer storage of claim 19, wherein performing the second assessment comprises:
accessing the checksum for the first file;
accessing a checksum for the second file;
comparing the checksum for the first file with the checksum for the second file to determine whether the checksum for the first file differs from the checksum for the second file;
in response to determining that the checksum for the first file differs from the checksum for the second file, replicating the first file from the first storage device to the second storage device; and
in response to determining that the checksum for the first file matches the checksum for the second file, synchronizing the attribute of the first file with the corresponding attribute of the second file without replicating the first file.

* * * * *

UNITED STATES PATENT AND TRADEMARK OFFICE
CERTIFICATE OF CORRECTION

| | | |
|---|---|---|
| PATENT NO. | : 8,868,494 B2 | Page 1 of 1 |
| APPLICATION NO. | : 13/957824 | |
| DATED | : October 21, 2014 | |
| INVENTOR(S) | : Vijay H. Agrawal | |

It is certified that error appears in the above-identified patent and that said Letters Patent is hereby corrected as shown below:

In the Drawings

Sheet 4 of 4 (Reference Numeral 330, FIG. 9) at line 2, Change "1M bps" to --1Mbps--.

In the Claims

In column 11 at line 32, In Claim 9, after "configured" insert --to--.

Signed and Sealed this
Twelfth Day of May, 2015

Michelle K. Lee
*Director of the United States Patent and Trademark Office*